UNITED STATES PATENT OFFICE.

BENJAMIN F. SWEZEY, OF BUFFALO, MINNESOTA.

FOOD.

1,416,588.  Specification of Letters Patent.  Patented May 16, 1922.

No Drawing.  Application filed September 30, 1920. Serial No. 413,767.

*To all whom it may concern:*

Be it known that I, BENJAMIN F. SWEZEY, a citizen of the United States, residing at Buffalo, in the county of Wright and State of Minnesota, have invented certain new and useful Improvements in Foods; and I do hereby declare the following to be a full, clear, and exact description of the invention, such as will enable others skilled in the art to which it appertains to make and use the same.

The object of the invention is to provide a method of preparing a cereal product for use as a breakfast food, and particularly to provide a breakfast or cereal food of which corn, either sweet corn or field corn constitutes the base, and with this object in view the invention consists in taking dried corn which has ripened on the ear and has been shelled therefrom by any known or approved method and subjecting the same to a cleaning or scouring treatment to divest it of all chaff or loose particles or portions of loose hulls which may adhere thereto or which may be fastened to the point of the kernel and may remain attached thereto when the corn is shelled, such scouring or cleaning operation being effected without in any way destroying or crushing or removing the hulls of the kernels which are to enter into the construction of the food.

After the completion of the cleaning or scouring operation, the kernels should be parched or roasted in any suitable apparatus adapted for the purpose such as a coffee roaster for a period of from seventeen to twenty-five minutes to the end that the kernels which are kept in constant motion as by a revolving cylinder during this portion of the operation, may be thoroughly cooked at a moderate temperature which for example should be in the neighborhood of 240 degrees Fahrenheit or for more if found necessary. The purpose is to cook the kernels so that they may become brittle without being scorched or burned, and after having been submitted to the parching or roasting step, they should be subjected to a current of cold air at a temperature of 60 degrees or less and preferably in a revolving cylinder or under such conditions as to maintain them in a condition of motion or agitation, with the object of making the kernels brittle or tender.

After having thus cooled or chilled the kernels subsequent to the parching or roasting operation, the corn should be run through a brushing machine to remove all of the scorched particles of the hull, together with any dust which may have adhered thereto or which may have become loosened by the parching or roasting step, and finally the corn should be ground to a fine meal when it is ready to serve, and may be consumed after the manner of any other of the several forms of cereal breakfast foods now commercially known.

It will be seen that the method disclosed provides for producing a substantial food containing all the nutrient properties of corn, and that in addition to being highly nutritious, the food is of a particularly palatable nature and is readily digestible without special or further preparation immediately prior to consumption. It will be understood that the brushing operation preceding the grinding thereof is not intended to remove any portions of hulls adhering or belonging to the perfect kernels which have passed through the parching or roasting operation, but merely the loose or detached and scorched particles of hulls which may have been loosened by the roasting operation, as the hulls properly belonging to the prepared kernels enter into and constitute an essential element of the completed product.

What is claimed is:—

1. The process of preparing a cereal food consisting in roasting grain kernels and thereafter agitating said grain kernels to render the same brittle.

2. The process of preparing a cereal food consisting in roasting grain kernels and in thereafter simultaneously agitating said grain kernels and subjecting the same to the action of air of lower temperature than the grain kernels.

3. The process of preparing a cereal food consisting in roasting grain kernels, in cooling the grain kernels, and in then removing scorched particles of the hulls of the grain kernels, and in finally reducing the grain kernels into meal.

4. The process of preparing a cereal food consisting in roasting grain kernels, in thereafter simultaneously agitating the grain kernels and subjecting them to the action of air of less temperature than the grain kernels, and then subjecting the grain kernels to the action of the brushing medium to remove scorched particles of the hulls of the kernels, and in then reducing said grain kernels into a meal.

5. The process of preparing a cereal food consisting of roasting grain kernels, agitating the grain kernels to render the same brittle, and in removing scorched particles of the hulls of the grain kernels.

In testimony whereof I affix my signature in presence of two witnesses.

BENJAMIN F. SWEZEY.

Witnesses:
HENRY SPINDLER,
CARL C. HAFFTEN.